UNITED STATES PATENT OFFICE.

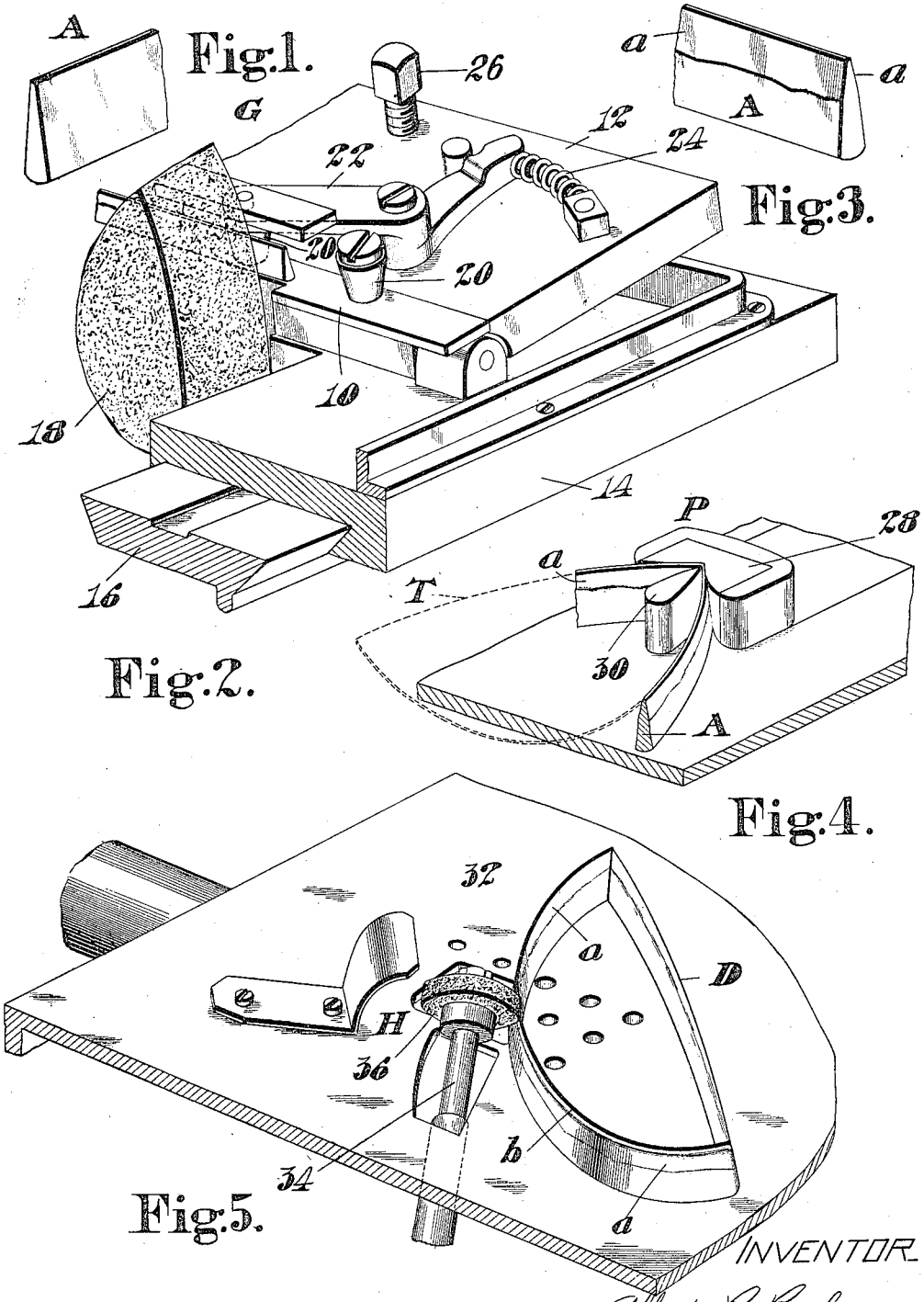

ALBERT R. BRADEN, OF BEVERLY, MASSACHUSETTS, ASSIGNOR TO UNITED SHOE MACHINERY CORPORATION, OF PATERSON, NEW JERSEY, A CORPORATION OF NEW JERSEY.

METHOD OF MAKING CUTTING-DIES.

1,317,753.

Specification of Letters Patent.

Patented Oct. 7, 1919.

Application filed October 7, 1918. Serial No. 257,199.

*To all whom it may concern:*

Be it known that I, ALBERT R. BRADEN, a citizen of the United States, residing at Beverly, in the county of Essex and State of Massachusetts, have invented certain Improvements in Methods of Making Cutting-Dies, of which the following description, in connection with the accompanying drawings, is a specification, like reference characters on the drawings indicating like parts in the several figures.

This invention relates to methods of producing cutting dies, and more particularly concerns the making of dies from bar stock.

In the manufacture of that type of dies having their cutting edges describing closed figures, such, for example, as clicking dies, it has been customary to employ a bar of steel of tapering cross-section, the base or pressure-receiving edge of the stock being about one-quarter of an inch thick, and the opposite edge, which is to be sharpened, being about one-sixteenth of an inch thick. The first step in the formation of the die from this stock, as usually performed, has been for the workman to bend the stock approximately to a templet having the configuration of the object to be cut, so that, when said templet was laid upon the smaller edge, its periphery would come within the boundaries of the flat surface. The ends of the stock were then welded together, the outline of the templet scratched upon the surface, and the decarbonized skin filed away from both sides of the die to leave the stock in condition for tempering and at the same time bring the die to substantially the line of the cutting edge, the inside preferably being fully to this point. Finally, the outside was ground to give the finished cutting edge of the form sought. This is a relatively costly method of procedure, the filing away the stock to the line requiring much time, especially the work at the inside of the die.

The object of the present invention is to furnish a method of die-making whereby the rate of production is increased and the cost decreased, without sacrifice of quality. My improved method consists generally in removing decarbonized portions from opposite sides of the stock, forming this stock, and thereafter removing a portion of the formed stock to produce a cutting edge. Steps of the method, together with the material operated upon and the product, are illustrated in the accompanying drawing.

Figure 1 being a perspective view of a piece of the bar stock;

Fig. 2, a similar view of grinding apparatus for effecting the removal of the decarbonized portions;

Fig. 3, a perspective view of the stock thus treated; and

Figs. 4 and 5, like views of apparatus for performing the successive steps of bending and sharpening the die.

In the performance of this method, the stock shown at A in Fig. 1 is preferably used, this being tapered in accordance with the usual practice, but being thinner at the edge which is to become the cutting edge, say, one-thirty-second of an inch. This is made possible by the fact that no surface is required on which to mark the outline of the cutting edge, and by this change there is effected both economy of material and of time required to reduce it to the cutting edge. There is first taken from this bar a length somewhat greater than the perimeter of the completed die, and this at its narrow edge, preferably at both sides thereof, is treated to remove the outer layer of decarbonized steel produced in the rolling of the stock, which would not give a properly tempered cutting edge. This step may be expeditiously accomplished by the employment of a grinding apparatus G, such as is illustrated in Fig. 2. Here the thick edge of the bar A is placed on the supporting plate 10 carried by a tilting table 12 pivoted on a slide 14 movable upon a base 16 toward and from a rotary grinding wheel, a portion of which is illustrated at 18. The bar is moved past the grinding wheel guided by tapered abutment studs 20, one of these being mounted at the inner end of a lever 22 pivoted on table 12 and acted on by a spring 24 to force the bar against the wheel. The amount of material removed by this step may be varied by changing the position of the slide upon the support, and the angle of the surface ground may be altered by a screw 26 threaded through the table 12 and contacting at its lower end with the slide. After one side has been thus treated, the bar is reversed and the opposite side ground. The stock is now as illustrated in Fig. 3, the removal of the material at *a—a* exposing steel of proper character for tempering to furnish a cutting edge.

By any convenient means, including, for example, a press P appearing in Fig. 4 and having fixed and movable abutments 28, 30, the stock is bent until one of the edges at *a* is brought to the form of a templet, indicated in dotted lines at *t*, after which the ends of the stock are welded so that the die appears as illustrated at D in Fig. 5, the interior line of the finished edge being true to the form of the templet. It only remains necessary to sharpen the cutting edge, and this may be done readily by such a simple grinding apparatus as is shown at H in Fig. 5. In this, the thick edge of the die rests on a table 32, through an opening in which extends an inclined rotatable spindle 34 having fixed upon it a grinding wheel 36. The outer portion *a* is moved over the wheel by sliding the die upon the table until, by the beveling off the material at *b*, a cutting edge is formed in the line to which the stock was bent about the templet. This completes the formation of the die, entirely, it will be seen, without such time-consuming operations as filing, which are only necessary in connection with this invention when a die has sharp reëntrant angles.

Having fully described my invention, what I claim as new and desire to secure by Letters Patent of the United States is:

1. The method of making cutting dies, which consists in removing the decarbonized portions from opposite sides of a bar of stock, forming the stock thus treated, and removing a portion of the formed stock to produce a cutting edge.

2. The method of making cutting dies, which consists in removing the decarbonized portions from the opposite sides of a bar of stock, bending the stock with one side true to form, connecting the ends of the formed stock, and reducing the formed stock to a cutting edge at the line to which the inner side is formed.

3. The method of making cutting dies, which consists in grinding opposite sides of a bar of straight stock, bending one of the ground edges to a templet, welding the ends of the stock thus formed, and grinding the outer side of the stock to sharpen the die.

In testimony whereof I have signed my name to this specification.

ALBERT R. BRADEN.

Copies of this patent may be obtained for five cents each, by addressing the "Commissioner of Patents, Washington, D. C."